US011713055B2

(12) United States Patent
Kim

(10) Patent No.: US 11,713,055 B2
(45) Date of Patent: Aug. 1, 2023

(54) SYSTEM AND METHOD FOR CONTROLLING STOP OF VEHICLE

(71) Applicants:Hyundai Motor Company, Seoul (KR); Kia Corporation, Seoul (KR)

(72) Inventor: Sang Jun Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 161 days.

(21) Appl. No.: 17/496,694

(22) Filed: Oct. 7, 2021

(65) Prior Publication Data

US 2022/0348219 A1    Nov. 3, 2022

(30) Foreign Application Priority Data

Apr. 28, 2021    (KR) .......................... 10-2021-0055182

(51) Int. Cl.
*B60W 60/00*    (2020.01)
*B62D 15/02*    (2006.01)
*B60W 30/18*    (2012.01)

(52) U.S. Cl.
CPC .... *B60W 60/001* (2020.02); *B60W 30/18109* (2013.01); *B62D 15/021* (2013.01); *B60W 2510/20* (2013.01); *B60W 2552/30* (2020.02); *B60W 2554/4045* (2020.02)

(58) Field of Classification Search
CPC ...... B60W 50/29; B60W 50/02; B60W 60/00; B60W 30/09; B60W 30/12; B60W 30/18; B62D 15/02
See application file for complete search history.

(56) References Cited

U.S. PATENT DOCUMENTS

| | | | |
|---|---|---|---|
| 2021/0163039 A1* | 6/2021 | Iwamoto | B60W 60/007 |
| 2022/0176992 A1* | 6/2022 | Nemoto | B60W 60/007 |
| 2022/0396276 A1* | 12/2022 | Bösch | B60W 10/04 |

* cited by examiner

*Primary Examiner* — Tan Q Nguyen
(74) *Attorney, Agent, or Firm* — Morgan, Lewis & Bockius LLP

(57) ABSTRACT

A system for controlling stop of a vehicle includes a steering angle comparison device that detects a current steering angle of the vehicle and compares the detected current steering angle with a preset limit steering angle when a malfunction of a steering system in the vehicle is detected during autonomous driving, a partial braking induction determination device that determines a position of a tire of the vehicle to be subjected to partial braking for steering control of the vehicle according to a result of the comparing between the current steering angle and the limit steering angle, and a partial braking control device that determines an amount of braking to be applied to each determined tire of the vehicle and applies a braking pressure corresponding to the amount of braking to each tire of the vehicle to perform the steering control by the partial braking.

20 Claims, 7 Drawing Sheets

SYSTEM AND METHOD FOR CONTROLLING STOP OF VEHICLE

CROSS-REFERENCE TO RELATED APPLICATION

The present application claims priority to Korean Patent Application No. 10-2021-0055182, filed on Apr. 28, 2021, the entire contents of which is incorporated herein for all purposes by this reference.

BACKGROUND OF THE INVENTION

Field of the Invention

The present invention relates to a system and a method for controlling stop of a vehicle capable of controlling the vehicle to stop when a steering system malfunctions during autonomous driving.

Description of Related Art

When a malfunction occurs in a steering system in a vehicle in autonomous driving, a system that controls the autonomous driving becomes unable to change a lane, so that it is common for the vehicle to have no choice but to rapidly stop within a traveling line.

However, when the vehicle in the autonomous driving stops within the line Accordingly, there was a problem in that it not only interferes with traveling of other vehicles traveling from the rear, but also significantly increases a possibility of a collision accident of the vehicle traveling from the rear that could not find the vehicle stopped because of the malfunction of the steering system.

Although the malfunction of the steering system does not occur frequently, when occurring during the traveling, especially the autonomous driving of the vehicle, the malfunction of the steering system may lead to a major accident with fatal results. Thus, there is still a demand for a redundancy system which may perform a safe stop in case of the malfunction of the steering system.

In a case of a large trailer vehicle, there was a problem of causing an unwanted jackknife phenomenon and invading an adjacent line during a sudden stop, impeding a progress of the vehicle traveling from the rear. Thus, there is still a demand for a system that controls the vehicle such that the vehicle may be safely moved to a shoulder and the like and stopped to minimize an effect on the vehicle traveling from the rear even in the event of the malfunction of the steering system.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and a method for controlling stop of a vehicle configured for preventing a risk of obstructing a traffic flow of a vehicle traveling from the rear by moving a vehicle to a shoulder or the like by emergency steering control, wherein the system includes a steering angle comparison device that detects a current steering angle of the vehicle and compares the detected current steering angle with a preset limit steering angle when a malfunction of a steering system in the vehicle is detected during autonomous driving, a partial braking induction determination device that determines a position of a tire of the vehicle to be subjected to partial braking for steering control of the vehicle according to a result of the comparing between the current steering angle and the limit steering angle, and a partial braking control device that determines an amount of braking to be applied to each determined tire of the vehicle and applies a braking pressure corresponding to the amount of braking to each tire of the vehicle to perform the steering control by the partial braking.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, a system for controlling stop of a vehicle includes a shoulder stop control device that generates a shoulder stop command of a reference path for guiding the vehicle to a shoulder in a traveling road of the vehicle when a malfunction of a steering system in the vehicle is detected during autonomous driving, a steering angle comparison device that detects a current steering angle of the vehicle and compares the detected current steering angle with a preset limit steering angle, a partial braking induction determination device that determines a position of a tire of the vehicle to be subjected to partial braking for steering control of the vehicle according to a result of the comparing between the current steering angle and the limit steering angle, and a partial braking control device that determines an amount of braking to be applied to each determined tire of the vehicle and apply a braking pressure corresponding to the amount of braking to each tire of the vehicle to perform the steering control by the partial braking.

In various exemplary embodiments of the present invention, the partial braking induction determination device may include a curvature comparison device that compares a curvature of a traveling road of the vehicle in the autonomous driving with a predetermined reference curvature, a lane change determination device that performs the steering control by the partial braking for changing a lane when the road curvature is smaller than the predetermined reference curvature as a result of the comparing the curvature, and determines to stop in a line without inducing the changing the lane when the road curvature is greater than the predetermined reference curvature, and a partial braking position determination device that determines the tire to be subjected to the partial braking for inducing a traveling direction of the vehicle in a direction of the shoulder.

In various exemplary embodiments of the present invention, the curvature comparison device may individually set a first reference curvature for determining whether the road is a low curvature road close to a straight line, and a second reference curvature for determining whether the road is a curved high curvature road requiring a steering angle of a level equal to or greater than a predetermined level.

In various exemplary embodiments of the present invention, the lane change determination device may determine to perform the steering control by the partial braking on a low curvature road when the road curvature is smaller than a preset first reference curvature, and determine to perform the steering control by the partial braking on a high curvature road when the road curvature is greater than the first reference curvature but smaller than a preset second reference curvature.

In various exemplary embodiments of the present invention, the partial braking position determination device may determine only a rear wheel of the vehicle positioned on a side thereof to be steered as a braking pressure-applied-tire when the lane change determination device concludes that the vehicle is in the autonomous driving on the low curvature road.

In various exemplary embodiments of the present invention, the partial braking position determination device may determine a front wheel and a rear wheel of the vehicle positioned on a side thereof to be steered as braking pressure-applied-tires when the lane change determination device concludes that the vehicle is in the autonomous driving on the high curvature road.

In various exemplary embodiments of the present invention, the partial braking induction determination device may further include a rotation support device that supports steering control of a tractor by allowing parking braking to occur on a tire on one side of a trailer in addition to partial braking occurring on a tire on one side of the tractor in a case of the vehicle with the trailer coupled to the tractor.

In various exemplary embodiments of the present invention, the rotation support device may determine a front wheel and a rear wheel positioned on a side to be steered among tires of the tractor as braking force-applied-tires, and also determine tires on a side opposite to the side where the partial braking of the tractor occurs among tires of the trailer as the braking force-applied-tires when it is determined that the vehicle is in the autonomous driving on a high curvature road.

In various exemplary embodiments of the present invention, the rotation support device may determine a front wheel and a rear wheel positioned on a side to be steered among tires of the tractor as braking force-applied-tires, and also determine tires on a side the same as the side where the partial braking of the tractor occurs among tires of the trailer as the braking force-applied-tires when the vehicle is in the autonomous driving on a low curvature road at a speed higher than a predetermined speed.

In various exemplary embodiments of the present invention, the partial braking control device may determine an amount of braking to be applied to a rear wheel on one side of the vehicle determined by the partial braking position determination device as a medium amount of braking (middle braking) when it is preferred to perform the steering control of the vehicle by the partial braking during traveling while keeping the lane on the low curvature road.

In various exemplary embodiments of the present invention, the partial braking control device may determine an amount of braking to be applied to a rear wheel on one side of the vehicle determined by the partial braking position determination device as a low amount of braking (low braking) when it is preferred to perform the steering control of the vehicle by the partial braking during traveling while keeping the lane on the low curvature road.

In various exemplary embodiments of the present invention, the partial braking control device may determine an amount of braking to be applied to a rear wheel on one side of the vehicle determined by the partial braking position determination device as a high amount of braking (high braking) when it is preferred to perform the steering control of the vehicle by the partial braking while changing the lane on the high curvature road.

In various exemplary embodiments of the present invention, the partial braking control device may determine an amount of braking to be applied together to a front wheel and a rear wheel on one side of the vehicle determined by the partial braking position determination device as a medium amount of braking (middle braking) when it is preferred to perform the steering control of the vehicle by the partial braking while changing the lane on the high curvature road.

According to various aspects of the present invention, a method for controlling stop of a vehicle includes a shoulder stop control operation for generating a shoulder stop command of a reference path for guiding the vehicle to a shoulder in a traveling road of the vehicle when a malfunction of a steering system in the vehicle is detected during autonomous driving, a steering angle comparison operation for detecting a current steering angle of the vehicle and comparing the detected current steering angle with a preset limit steering angle, a partial braking induction determination operation for determining a position of a tire of the vehicle to be subjected to partial braking for steering control of the vehicle according to a result of the comparing between the current steering angle and the limit steering angle, and a partial braking control operation for determining an amount of braking to be applied to each determined tire of the vehicle and applying a braking pressure corresponding to the amount of braking to each tire of the vehicle to perform the steering control by the partial braking.

In various exemplary embodiments of the present invention, the partial braking induction determination operation may include a curvature comparison process for comparing a curvature of a traveling road of the vehicle in the autonomous driving with a predetermined reference curvature, a lane change determination process for performing the steering control by the partial braking for changing a lane when the road curvature is smaller than the predetermined reference curvature as a result of the comparing the curvature, and determining to stop in a line without inducing the changing the lane when the road curvature is greater than the predetermined reference curvature, and a partial braking position determination operation for determining the tire to be subjected to the partial braking for inducing a traveling direction of the vehicle in a direction of the shoulder.

In various exemplary embodiments of the present invention, the lane change determination process may include determining to perform the steering control by the partial braking on a low curvature road when the road curvature is smaller than a preset first reference curvature, and determining to perform the steering control by the partial braking on a high curvature road when the road curvature is greater than the first reference curvature but smaller than a preset second reference curvature.

In various exemplary embodiments of the present invention, the partial braking position determination process may include determining only a rear wheel of the vehicle positioned on a side thereof to be steered as a braking pressure-applied-tire when it is determined in the lane change determination process that the vehicle is in the autonomous driving on the low curvature road.

In various exemplary embodiments of the present invention, the partial braking position determination process may include determining a front wheel and a rear wheel of the vehicle positioned on a side thereof to be steered as braking pressure-applied-tires when it is determined in the lane change determination process that the vehicle is in the autonomous driving on the high curvature road.

In various exemplary embodiments of the present invention, the partial braking induction determination operation may further include a rotation support process for determining a front wheel and a rear wheel positioned on a side to be steered among tires of the tractor as braking force-applied-tires, and also determining tires on a side opposite to the side where the partial braking of the tractor occurs among tires of the trailer as the braking force-applied-tires when it is determined that a vehicle with the trailer coupled to the tractor is in the autonomous driving on a high curvature road.

In various exemplary embodiments of the present invention, the partial braking induction determination operation may further include a rotation support process for determining a front wheel and a rear wheel positioned on a side to be steered among tires of the tractor as braking force-applied-tires, and also determining tires on a side a same as the side where the partial braking of the tractor occurs among tires of the trailer as the braking force-applied-tires when it is determined that a vehicle with the trailer coupled to the tractor is in the autonomous driving on a low curvature road at a speed higher than a predetermined speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
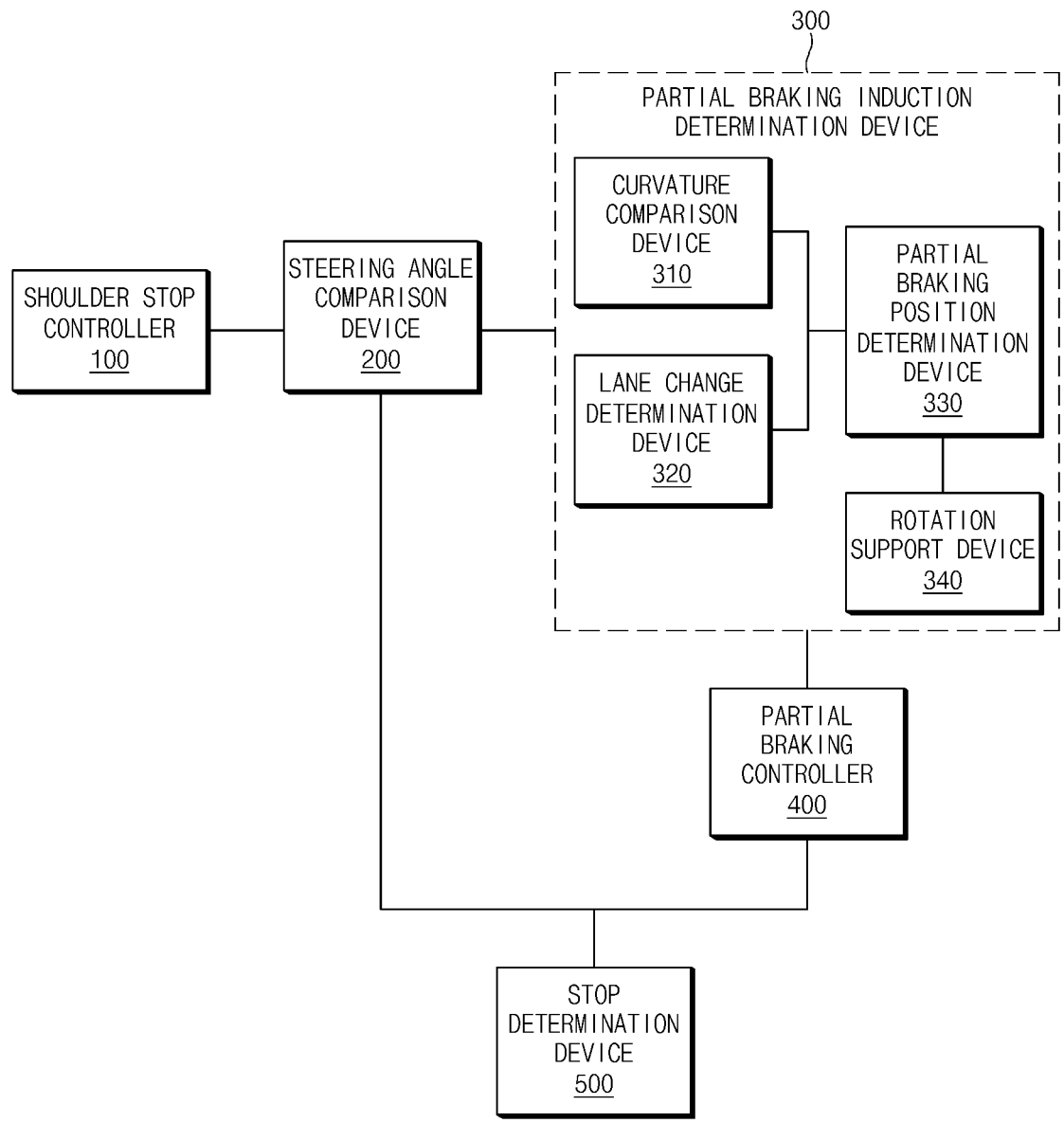
FIG. 1 is a block diagram of a vehicle stop control system according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of the related known configuration or function will be omitted when it is determined that it interferes with the understanding of the exemplary embodiment of the present invention.

In describing the components of the exemplary embodiment according to various exemplary embodiments of the present invention, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

Hereinafter, embodiments of the present invention will be described in detail with reference to FIGS. 1 to 7.

FIG. 1 is a block diagram of a vehicle stop control system according to various exemplary embodiments of the present invention.

Referring to FIG. 1, a vehicle stop control system according to various exemplary embodiments of the present invention may include a shoulder stop control device 100 that generates a shoulder stop command of a reference path that guides a vehicle to a shoulder when a malfunction of a steering system in the vehicle is detected during autonomous driving, a steering angle comparison device 200 that detects a current steering angle of the vehicle and compares the detected current steering angle with a preset limit steering angle, a partial braking induction determination device 300 that determines a position of a tire of the vehicle to be subjected to partial braking for steering control according to a result of the comparing between the current steering angle and the limit steering angle, and a partial braking control device 400 that determines an amount of braking to be applied to each determined tire of the vehicle and applies a braking pressure corresponding to the amount of braking to each tire of the vehicle to perform the steering control by the partial braking.

When it is detected that the malfunction has occurred in the steering system of the vehicle in the autonomous driving and the steering control has become impossible, the shoulder stop controller 100 may generate the shoulder stop command for controlling the vehicle to stop on the shoulder or the like.

Such shoulder stop controller 100, which is a kind of redundancy system provided as an element of an upper level controller that is configured to control the autonomous driving of the vehicle, may be activated only when the malfunction of the steering system is detected to generate the shoulder stop command for the vehicle.

Figure 2:
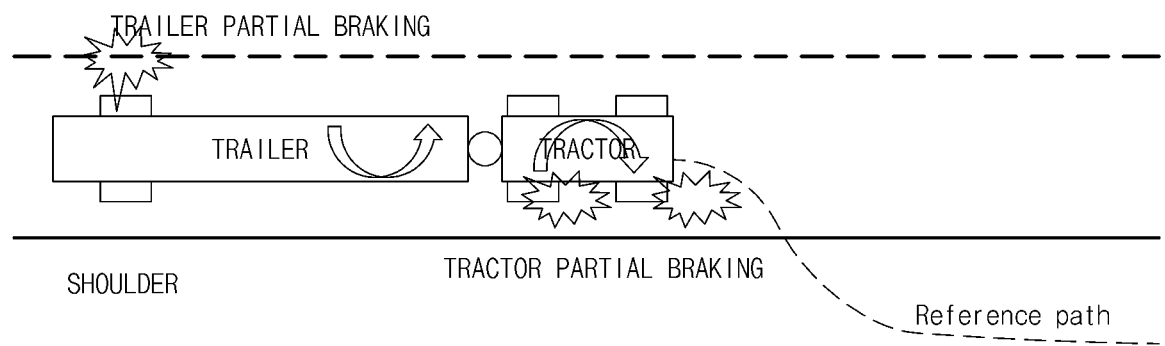
FIG. 2 is an exemplary diagram showing that partial braking of a trailer is performed auxiliary to partial braking of a tractor according to various exemplary embodiments of the present invention.

Furthermore, when generating the shoulder stop command because of the malfunction of the steering system, as shown in FIG. 2, the shoulder stop controller 100 may generate the reference path for guiding the vehicle to the shoulder from a current line in which the vehicle in the autonomous driving is traveling.

The steering angle comparison device 200 may compare the current steering angle of the vehicle which is fixed in the malfunctioning state of the steering system with the preset limit steering angle to determine whether to perform the steering control by the partial braking.

In the present connection, when the current steering angle is smaller than the limit steering angle as the result of the comparison, by the steering angle comparison device 200, between the current steering angle of the vehicle with the preset limit steering angle, the partial braking induction determination device 300 may subdivide and determine the positions and the number of tires on which the partial braking is to be performed.

However, when the current steering angle is greater than the limit steering angle as the result of the comparison, by the steering angle comparison device 200, between the current steering angle and the limit steering angle, after determining that the steering control by the partial braking is not easy because the vehicle is steered excessively, the partial braking induction determination device 300 may perform vehicle stop by a maximum braking force within the traveling line instead of guiding the vehicle to move to the shoulder.

In the present connection, it is illustrated in the exemplary embodiment that the limit steering angle (StrLimit) is set to 5°, but the present invention is not limited to such specific steering angle value. In one example, the value of the limit steering angle may be set differently based on a weight or a size of the vehicle, and the value of the limit steering angle may be set differently based on a travel speed of the vehicle in the autonomous driving.

Furthermore, the partial braking induction determination device 300 may determine the positions and the number of tires to be subjected to the partial braking for guiding the vehicle in a direction of the shoulder based on a degree of curvature of a road and the reference path.

Accordingly, in properly inducing a lane change to the shoulder based on a current state of the vehicle in which the steering system malfunctions, it is possible to perform subdivided precise control, as well as to ensure safety of the traveling vehicle.

To the present end, the partial braking induction determination device 300 may include a curvature comparison device 310 that compares a curvature of a road on which the vehicle in the autonomous driving is traveling with a predetermined reference curvature, a lane change determination device 320 that performs the steering control by the partial braking for changing the lane when the road curvature is smaller than the predetermined reference curvature as a result of the curvature comparison, and determines to stop in the line without inducing the lane change when the road curvature is greater than the predetermined reference curvature, and a partial braking position determination device 330 that determines the tire to be subjected to the partial braking that induces a traveling direction of the vehicle to the direction of the shoulder.

The curvature comparison device 310 may individually set, as the reference curvature for determining the curvature of the road on which the vehicle is traveling, a first reference curvature for determining whether the road is a low curvature road close to a straight line, and a second reference curvature for determining whether the road is a curved high curvature road requiring a steering angle of a level equal to or greater than a predetermined level.

In the present connection, the first reference curvature (CLimit_1) may be set to 0.001 $(m^{-1})$, and the second reference curvature (CLimit_2) may be set to 0.002 $(m^{-1})$. However, the first reference curvature and the second reference curvature may not be limited to the above-described specific values and may be set variously.

Furthermore, the lane change determination device 320 may determine to perform the steering control by the partial braking on the low curvature road when the road curvature is smaller than the first reference curvature, and determine to perform the steering control by the partial braking on the high curvature road when the road curvature is greater than the first reference curvature but smaller than the second reference curvature.

However, when the road curvature is greater than the second reference curvature, the lane change determination device 320 may determine that the vehicle is traveling on a super high curvature road, and determine to perform the stop within the line without performing the steering control by the partial braking. Accordingly, the lane change by the partial braking may be prevented from being performed excessively when the road curvature is a super high curvature.

Accordingly, as the lane change determination device 320 compares the road curvature with the first reference curvature and the second reference curvature to allow a state of the road to be determined in advance, in performing the partial braking in an emergency situation in which the steering system malfunctions, appropriate precise control may be performed based on the situation of the low curvature road and the high curvature road.

Furthermore, when it is determined by the lane change determination device 320 that the vehicle is in the autonomous driving on a straight road or the low curvature road close to the straight line, the partial braking position determination device 330 may determine only a rear wheel of the vehicle positioned on a side thereof to be steered as the tire to which the braking pressure is applied.

That is, when the partial braking occurs on a rear wheel on one side during the traveling on the low curvature road, a rotational force for rotating front wheels on left and right sides and a rear wheel to which the braking pressure is not applied among rear wheels around the rear wheel to which the braking pressure is applied may be generated. Because the rotational force generated as such may generate a steering angle that changes the traveling direction of the vehicle along a rotation direction thereof, in spite of the malfunction of the steering system, the steering control for changing the lane in the direction of the shoulder or the like becomes possible.

Furthermore, when it is determined by the lane change determination device 320 that the vehicle is in the autonomous driving on the high curvature road close to a curve requiring turning, the partial braking position determination device 330 may determine both a front wheel and a rear wheel positioned on the side to be steered as the tires to which the braking pressure is applied.

That is, as shown in FIG. 2, when the braking pressure is applied together to the front wheel and the rear wheel on one side of the vehicle, and thus, the partial braking occurs during the traveling on the high curvature road, a rotational force for rotating a tire of the vehicle on a side to which the braking pressure is not applied toward the side to which the braking pressure is applied may be generated. The rotational force generated as such may generate a steering angle for moving the vehicle to the side where the partial braking has occurred, that is, for changing the lane in the direction of the shoulder. Thus, in spite of the malfunction of the steering system, the steering control for the lane change in the direction of the shoulder becomes possible.

In the present connection, whether the vehicle is in the autonomous driving on the low curvature road may be determined by the lane change determination device 320 based on the result of the comparing between the road curvature with the reference curvature. Accordingly, when the road curvature is smaller than the first reference curvature, it may be determined that the vehicle is traveling on the low curvature road. Furthermore, when the road curvature is greater than the first reference curvature but smaller than the second reference curvature, it may be determined that the vehicle is traveling on the high curvature road.

By subdividing and determining the position of the tire to which the braking force is to be applied to occur the partial braking based on the curvature of the road by the partial braking position determination device 330 as described above, it is possible to prevent the vehicle from rotating excessively on the low curvature road, and from oscillating while rotating insufficiently on the high curvature road.

Furthermore, in a case of a vehicle in which a trailer is coupled to a tractor, the partial braking induction determination device 300 may further include a rotation support device 340 that supports steering control of the tractor by allowing the parking braking to occur on a tire on one side of the trailer in addition to the partial braking occurring on a tire on one side of the tractor.

In the present connection, when it is determined that the vehicle is in the autonomous driving on the high curvature road, as shown in FIG. 2, the rotation support device 340 may determine both a front wheel and a rear wheel positioned on a side to be steered among tires of the tractor as the tires to which the braking force is applied, and also determine tires on a side opposite to the side where the partial braking of the tractor occurs among tires of the trailer as the tires to which the braking force is applied.

Accordingly, by allowing the partial braking to occur on the trailer at a position opposite to the position of the tire where the partial braking occurs in the tractor, it is possible to generate a rotational force for rotating a kingpin that couples the trailer to the tractor in a direction to be steered like a steering wheel.

Accordingly, stability of the lane change induced by the partial braking may be improved by pushing the tractor in the direction to be steered by the partial braking occurring on the tire on one side of the trailer to support the rotational force required for the lane change, as well as allowing the trailer to enter the line on the high curvature road.

Furthermore, when it is determined that the vehicle is in the autonomous driving on the straight road or the low curvature road close to the straight line at a high speed, the rotation support device 340 may determine both the front wheel and the rear wheel positioned on the side to be steered among the tires of the tractor as the tires to which the braking force is applied, and also determine tires on a side the same as the side where the partial braking of the tractor occurs among the tires of the trailer as the tires to which the braking force is applied.

In the present connection, a case in which the vehicle in the autonomous driving is traveling on the low curvature road at a speed equal to or greater than 90 km/h may be determined as a high speed traveling state that requires the application of the braking force even to the tire on one side of the trailer by the rotation support device. However, a speed for determining whether the vehicle is at the high speed may be set differently, as well as a speed for determining whether the vehicle is at the high speed based on a total weight of the trailer may be set differently.

As described above, oscillation which may occur in the tractor rotating by the partial braking occurred in the tractor may be reduced by allowing the partial braking to occur on the trailer at a position the same as the position of the tire where the partial braking occurs of the tractor.

Figure 5:
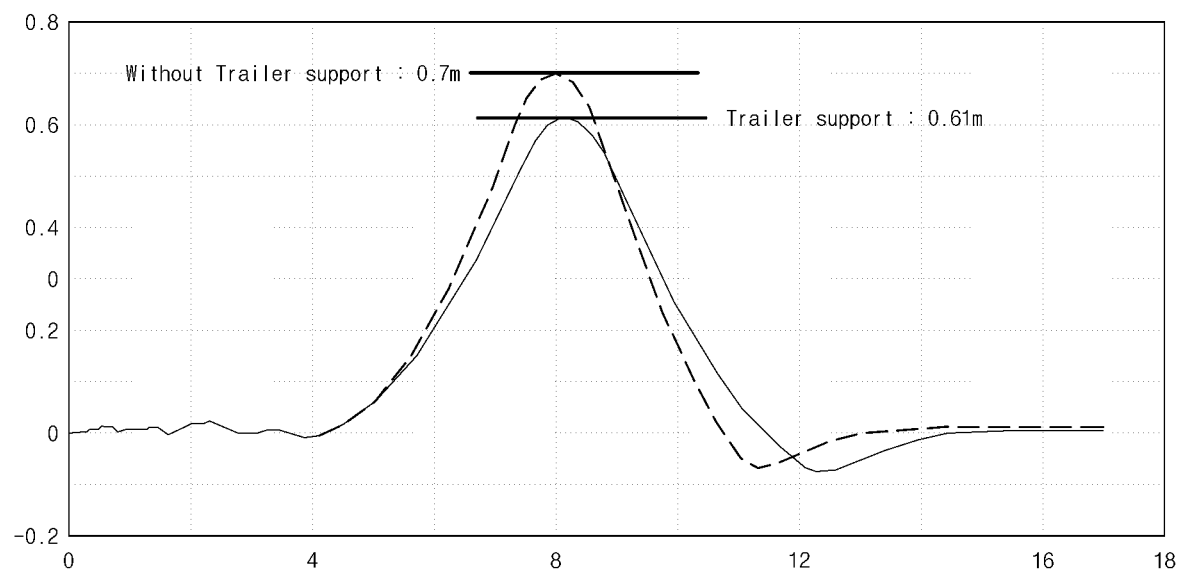
FIG. 5 is a graph showing a degree of reduction in a lateral error during partial braking support of a trailer according to various exemplary embodiments of the present invention.

Accordingly, as shown in FIG. 5, a degree of deviation of the trailer in a lateral direction from a center of the vehicle may be reduced in the case in which the rotational force for changing the lane is supported by the trailer, compared to a case in which it is not. In FIG. 5, the case in which the rotational force is not supported by the trailer (Without Trailer support) is indicated by a dotted line, and the case in which the rotational force is supported by the trailer (Trailer support) is indicated by a solid line. It may be seen from FIG. 5 that a degree of deviation from a center portion of the line is at most 0.7 m in the case in which the rotational force is not supported by the trailer, whereas the degree of deviation from the center portion of the line is up to 0.61 m in the case in which the rotational force is supported by the trailer.

Furthermore, the partial braking control device 400 may determine the amount of braking to be applied to each tire of the vehicle determined by the partial braking position determination device 330 to allow the partial braking to occur and apply the braking pressure corresponding to the determined amount of braking to each tire of the vehicle to perform the steering control by the partial braking.

In the present connection, the partial braking control device 400 may determine an exact value of the amount of braking applied to each tire of the vehicle to allow the partial braking to occur based on information such as the speed and the steering angle of the vehicle, the road curvature, and the like. However, after setting each of a low amount of braking, a medium amount of braking, and a high amount of braking having a value in a certain range in advance to enable rapid response in the emergency situation, one of the amounts of braking may be determined as the amount of braking to be applied to the tire.

In the present connection, the low amount of braking (low braking) may be set as a braking force with a braking pressure to be applied equal to or lower than about 0.3 Mpa, the medium amount of braking (middle braking) may be set as a braking force with a braking pressure to be applied in a range from about 0.3 to 0.5 Mpa, and the high amount of braking (high braking) may be set as a braking force with a braking pressure to be applied in a range from 0.5 to 0.7 Mpa.

Accordingly, the partial braking control device 400 may determine one of the low amount of braking, the medium amount of braking, and the high amount of braking based on whether to keep the lane or change the lane, and whether the road curvature is a low curvature or a high curvature when stopping the vehicle in which the steering system is malfunctioning, and control the determined amount of braking to be applied to the tire.

To the present end, when it is desired to perform the steering control of the vehicle by the partial braking during the traveling while keeping the lane on the road with the low curvature (lane keeping & low curvature), the partial braking control device 400 may determine the amount of braking to be applied to the tire of the rear wheel on one side of the vehicle determined by the partial braking position determination device 330 as the medium amount of braking.

Figure 3:
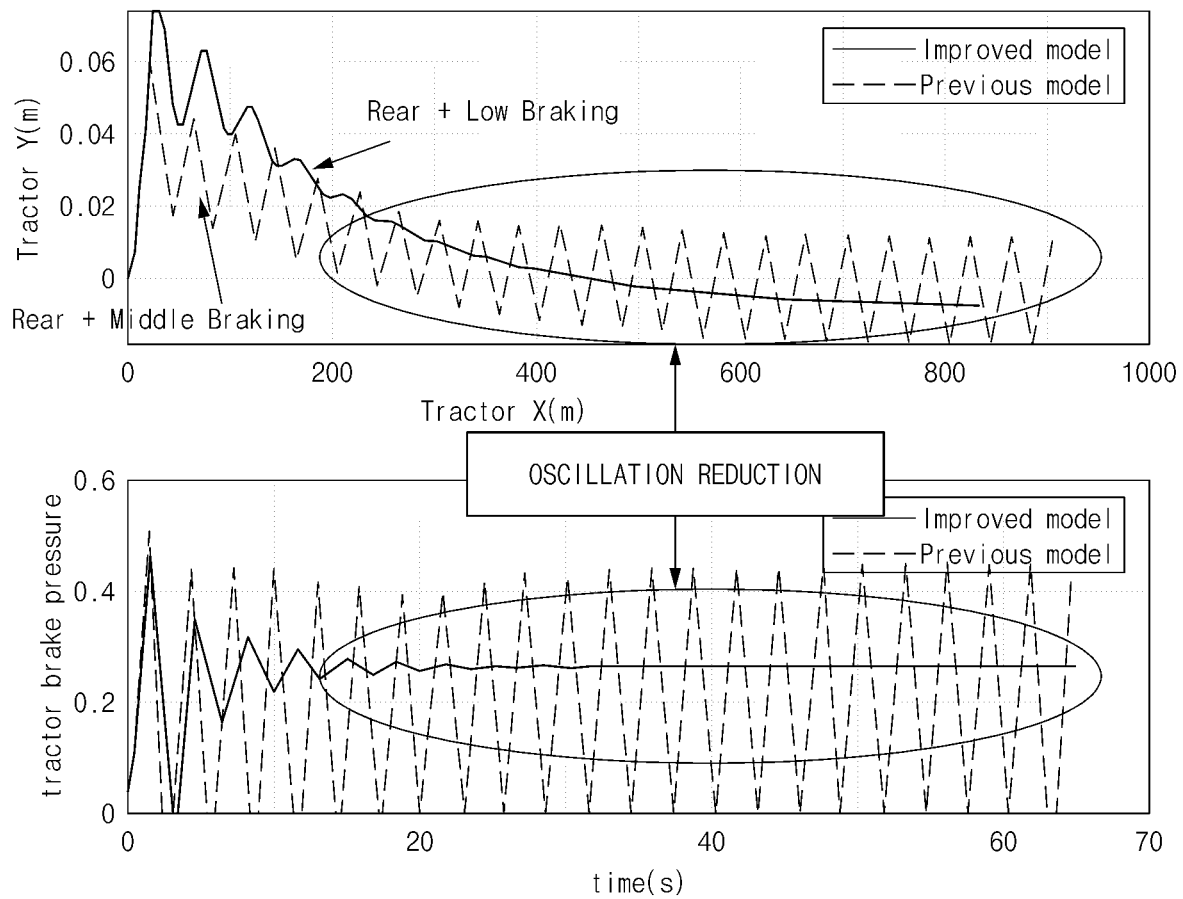
FIG. 3 is a graph showing a lateral oscillation state during partial braking control for lane maintenance according to various exemplary embodiments of the present invention.

When applying the medium amount of braking (the middle braking) to the rear wheel on one side of the vehicle, as shown by a dotted line in FIG. 3, a degree of steering control of the vehicle may be changed larger and faster, but oscillation of shaking in a left and right direction may occur while the vehicle moves until the vehicle stops.

That is, when the vehicle is steered excessively to one side by applying the braking pressure to the rear wheel on one side of the vehicle, the vehicle must experience the oscillation phenomenon in which the lateral movement of the vehicle repeats in the left and right direction while keeping the lane like a situation in which the braking pressure must be reduced and then must be applied again to keep the lane until a situation in which the lane change to the shoulder or the like for the stop arises. In the present connection, in one example, it is possible to control the braking pressure to be applied to the rear wheel on the other side of the vehicle to keep the lane.

Furthermore, when it is desired to perform the steering control of the vehicle by the partial braking during the traveling while keeping the lane on the road with the low curvature (the lane keeping & the low curvature), to reduce such oscillation, the partial braking control device 400 may determine the amount of braking to be applied to the tire on one side of the rear wheel of the vehicle determined by the partial braking position determination device as the low amount of braking.

When applying the low amount of braking (the low braking) to the rear wheel on one side of the vehicle Accordingly, as shown by a solid line in FIG. 3, although the steering control takes a longer time because the degree of steering of the vehicle is not large, it is possible to reduce the oscillation in which the vehicle shakes in the left and right direction thereof, so that more stable steering control may be performed.

Furthermore, when applying the medium amount of braking as shown by a dotted line in a lower graph in FIG. 3 to induce the partial braking, during the process of the steering control for keeping the lane, a process of increasing and decreasing a magnitude of the braking pressure applied to the rear wheel of the vehicle may be repeated, or the steering control may be performed by applying the braking pressure to the rear wheel on the opposite side of the vehicle. On the other hand, when applying the low amount of braking, as shown by a solid line in the lower graph in FIG. 3, it is possible to minimize a change in a magnitude of the low amount of braking applied to the rear wheel on one side of the vehicle, so that the more stable steering control may be performed.

FIG. 3 represents a change while a tractor with a malfunctioning steering system keeps the lane, a graph shown above represents a lateral movement of the tractor (Tractor Y) which may occur while the steering control by the partial braking is performed, and the graph shown below represents a change in the braking pressure (a tractor brake pressure) applied to the vehicle for the steering control by the partial braking.

In various exemplary embodiments of the present invention, as shown in Table 1 below, in the case of traveling while keeping the lane on the low curvature road (the lane keeping & the low curvature), the case in which the medium amount of braking is applied to the rear wheel of the vehicle is represented as a previous model, and the case in which the low amount of braking is applied to the rear wheel of the vehicle is represented as an improved model. Both the previous model and the improved model are to perform the steering control for keeping the lane, and may be appropriately selected by the partial braking control device based on a situation of the road and a type of vehicle. In the present connection, the expression "previous model" does not imply related art, but rather a type of control amount which may be selected by the partial braking control device.

TABLE 1

|  | Previous Model | Improved Model |
| --- | --- | --- |
| Lane keeping& Low Curvature | Rear wheel + Medium amount of braking | Rear wheel + Low amount of braking |
| Lane changing& High Curvature | Rear wheel + High amount of braking | Front wheel + Rear wheel + Medium amount of braking |

Furthermore, when it is desired to perform the steering control of the vehicle by the partial braking while changing the lane on the high curvature road (lane changing & high curvature), the partial braking control device 400 may determine the amount of braking to be applied to the rear wheel of the vehicle determined by the partial braking position determination device 330 as the high amount of braking.

Figure 4:
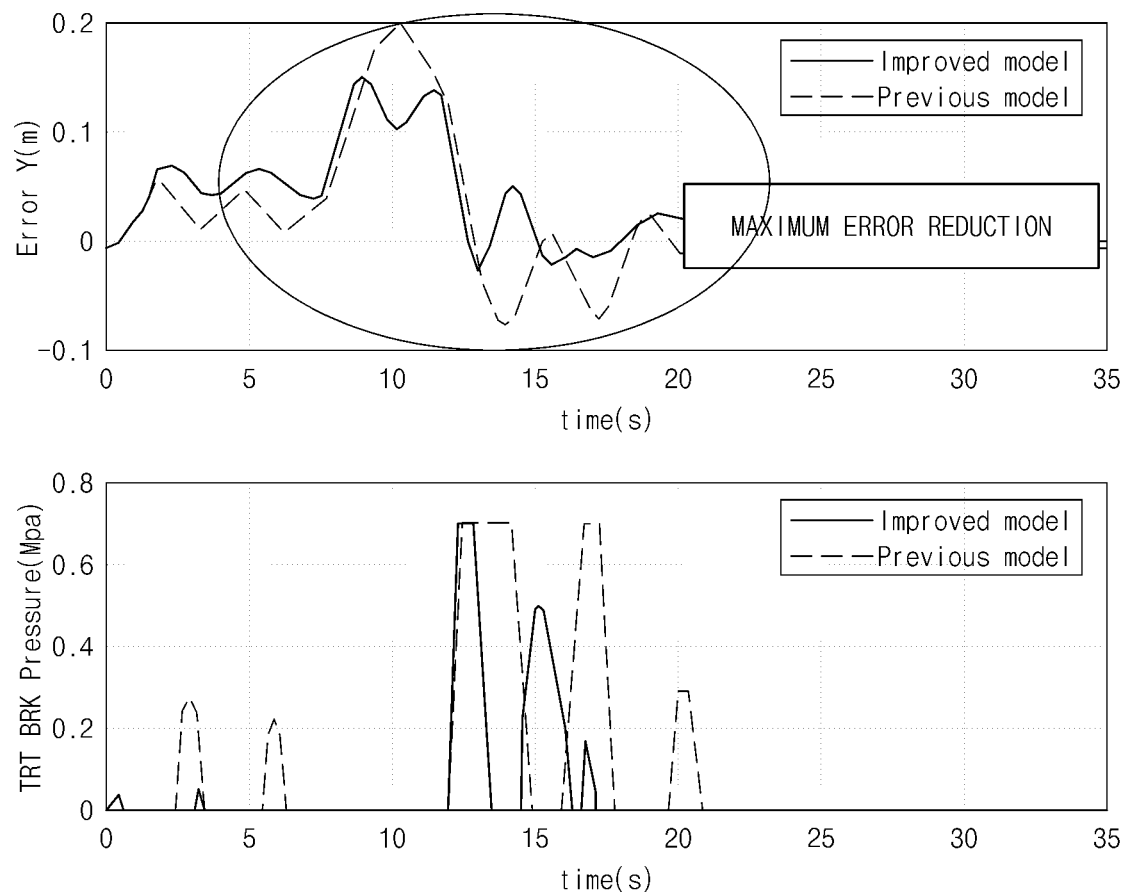
FIG. 4 is a graph showing a lateral error state during partial braking control for a lane change according to various exemplary embodiments of the present invention.

When applying the high amount of braking (the high braking) to the rear wheel of the vehicle to change the lane Accordingly, although rapid steering and deceleration may be made, as shown by a dotted line in FIG. 4, a lateral error (Error Y) of deviating excessively in the lateral direction may increase.

Accordingly, to reduce such lateral error, as shown in Table 1, when it is desired to perform the steering control of the vehicle by the partial braking while changing the lane on the high curvature road (the lane changing & the high curvature), the partial braking control device 400 may determine the amount of braking to be applied together to the front wheel and the rear wheel on one side of the vehicle determined by the partial braking position determination device 330 as the medium amount of braking.

When applying the medium amount of braking (the middle braking) together to the front wheel and the rear wheel on one side of the vehicle Accordingly, as shown by a solid line in FIG. 4, the lateral error (the Error Y) is reduced, so that more stable steering control may be performed.

FIG. 4 represents a change while the tractor with the malfunctioning steering system changes the lane, a graph shown above represents the lateral error (the Error Y) which may occur during the steering control by the partial braking for the lane change, and a graph shown below represents a change in a braking pressure (a TRT BRK Pressure) applied to the tractor for the steering control by the partial braking.

Furthermore, the partial braking control device 400 may further include a stop determination device 500 that, when the vehicle fully enters the shoulder as a result of the steering control induced by the partial braking, or when the vehicle stops in the line without changing the lane as it is difficult to change the lane only by the steering control by the partial braking because the steering angle is too large or the road curvature exceeds the reference curvature, detects the same and stops the vehicle.

It is possible to prevent the autonomous driving from continuing unreasonably in the state in which the steering system malfunctions by stopping the vehicle on the shoulder or in the line by the stop determination device 500.

Next, a vehicle stop control method according to various exemplary embodiments of the present invention will be described with reference to FIG. 6 and FIG. 7.

Figure 6:
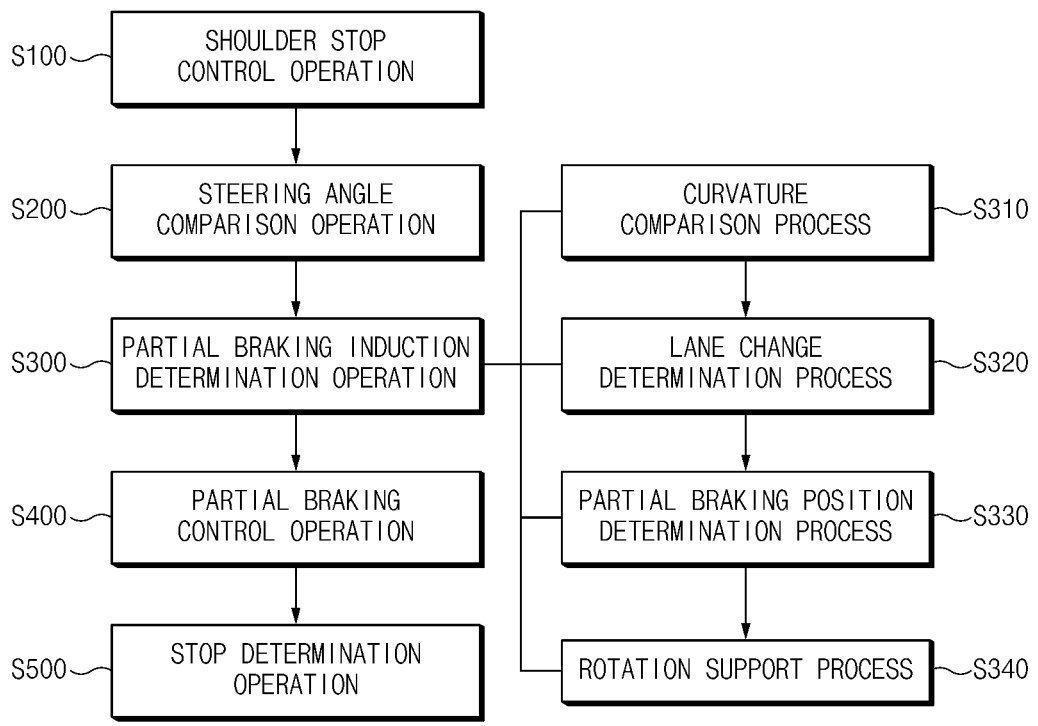
FIG. 6 is a block diagram of a vehicle stop control method according to various exemplary embodiments of the present invention.
Figure 7:
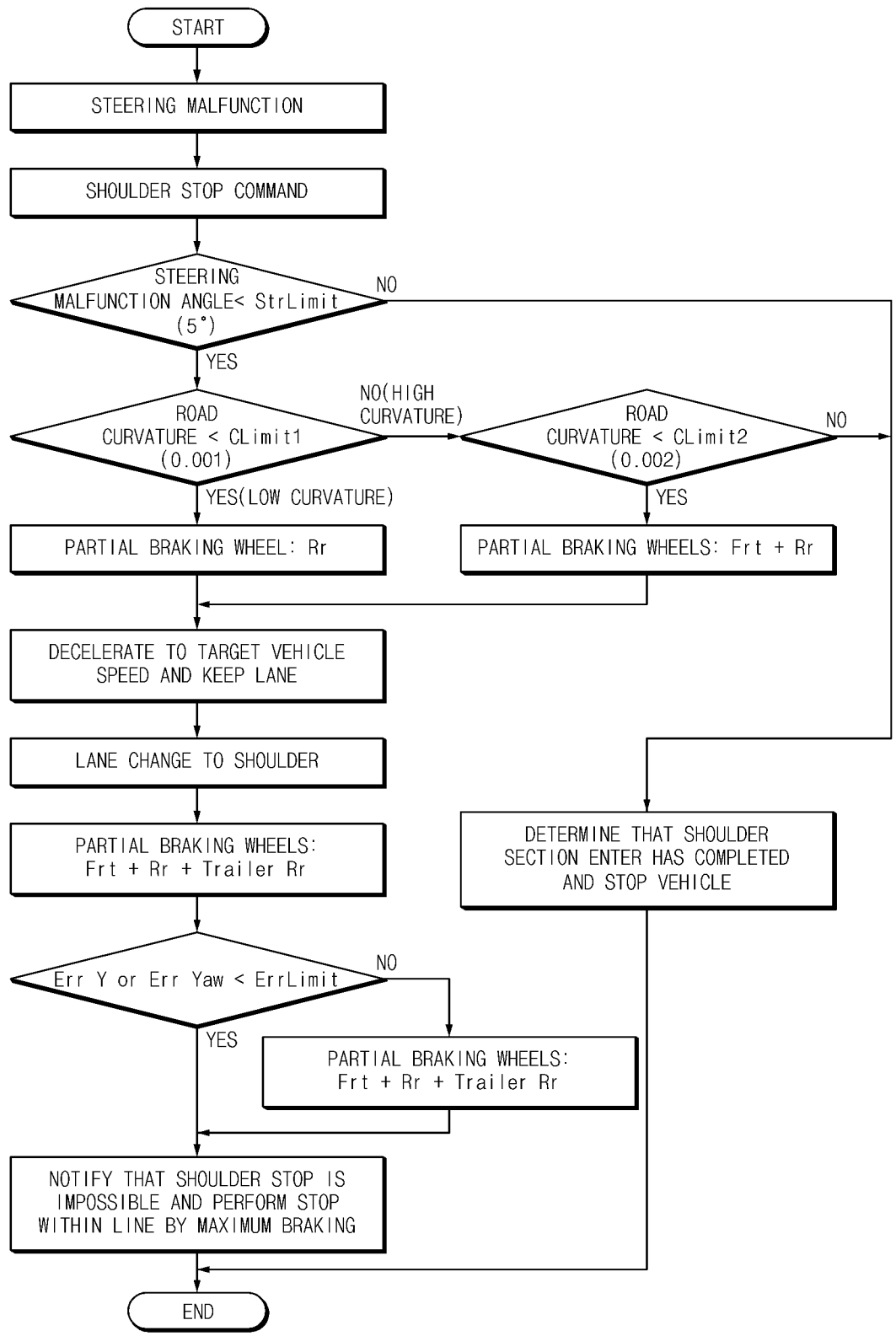
FIG. 7 is a flowchart showing a flow of vehicle stop using partial braking when a steering system malfunctions, according to various exemplary embodiments of the present invention.

Referring to FIG. 6 and FIG. 7, a vehicle stop control method according to various exemplary embodiments of the present invention may include a shoulder stop control operation (S100) of generating the shoulder stop command the reference path that guides the vehicle to the shoulder when the malfunction of the steering system is detected during the autonomous driving, a steering angle comparison operation (S200) of detecting the current steering angle of the vehicle and comparing the detected current steering angle with the preset limit steering angle, a partial braking induction determination operation (S300) of determining the position of the tire to be subjected to the partial braking for the steering control based on the result of the comparing between the current steering angle and the limit steering angle, and a partial braking operation (S400) of determining the amount of braking to be applied to each determined tire of the vehicle and applying the braking pressure corresponding to the amount of braking to each tire of the vehicle to perform the steering control by the partial braking.

In the shoulder stop control operation (S100), when it is detected that the malfunction has occurred in the steering system of the vehicle in the autonomous driving and the steering control has become impossible, the shoulder stop command for controlling the vehicle to stop on the shoulder or the like may be generated.

Furthermore, in the shoulder stop control operation (S100), the reference path for guiding the vehicle to the shoulder from the current line may be generated when generating the shoulder stop command due to the malfunction of the steering system.

In the steering angle comparison operation (S200), the current steering angle of the vehicle which is fixed in the malfunctioning state of the steering system may be compared with the preset limit steering angle to determine whether to perform the steering control by the partial braking.

In the present connection, when the current steering angle is smaller than the limit steering angle as the result of the comparing between the current steering angle of the vehicle with the preset limit steering angle in the steering angle comparison operation (S200), the positions and the number of tires on which the partial braking is to be performed may be subdivided and determined in the partial braking induction determination operation (S300).

However, when the current steering angle is greater than the limit steering angle as the result of the comparing between the current steering angle and the limit steering angle in the steering angle comparison operation (S200), after determining that the steering control by the partial braking is not easy because the vehicle is steered excessively, it may be determined to perform the vehicle stop by the maximum braking force within the traveling line instead of guiding the vehicle to move to the shoulder.

In the present connection, it is illustrated in FIG. 7 that the limit steering angle (StrLimit) is set to 5°, but the present invention is not limited to such specific steering angle value. In one example, the value of the limit steering angle may be set differently based on the weight or the size of the vehicle.

Furthermore, in the partial braking induction determination operation (S300), the positions and the number of tires to be subjected to the partial braking for guiding the vehicle in the direction of the shoulder may be determined based on the degree of curvature of the road and the reference path.

To the present end, the partial braking induction determination operation (S300) may include a curvature comparison process (S310) of comparing the curvature of the road on which the vehicle in the autonomous driving is traveling with the predetermined reference curvature, a lane change determination process (S320) configured to perform the steering control by the partial braking for changing the lane when the road curvature is smaller than the predetermined reference curvature as the result of the curvature comparison, and determining to stop in the line without inducing the lane change when the road curvature is greater than the predetermined reference curvature, and a partial braking position determination process (S330) of determining the tire to be subjected to the partial braking that induces the traveling direction of the vehicle to the direction of the shoulder when the steering control by the partial braking is possible.

In the curvature comparison process (S310), the first reference curvature for determining whether the road is the low curvature road close to the straight line, and the second reference curvature for determining whether the road is the curved high curvature road requiring the steering angle of the level equal to or greater than the certain level may be individually set as the reference curvature for determining the curvature of the road on which the vehicle is traveling.

In the present connection, as illustrated in FIG. 7, the first reference curvature (CLimit_1) may be set to 0.001 (m$^{-1}$), and the second reference curvature (CLimit_2) may be set to 0.002 (m$^{-1}$). However, the first reference curvature and the second reference curvature may not be limited to the above-described specific values and may be set variously.

Furthermore, in the lane change determination process (S320), it may be determined to perform the steering control by the partial braking by determining that the vehicle is traveling on the low curvature road when the road curvature is smaller than the first reference curvature, and it may be determined to perform the steering control by the partial braking by determining that the vehicle is traveling on the high curvature road when the road curvature is greater than the first reference curvature but smaller than the second reference curvature.

However, in the lane change determination process (S320), when the road curvature is greater than the second reference curvature, it may be determined to perform the stop within the line without performing the steering control by the partial braking by determining that the vehicle is traveling on the super high curvature road. Accordingly, the lane change by the partial braking may be prevented from being performed excessively when the road curvature is the super high curvature.

Accordingly, in the lane change determination process (S320), the road curvature may be compared with the first reference curvature and the second reference curvature to allow the state of the road to be determined in advance, so that, in performing the partial braking in the emergency situation in which the steering system malfunctions, the appropriate precise control may be performed based on the situation of the low curvature road and the high curvature road.

Furthermore, in the partial braking position determination process (S330), when it is determined in the lane change determination process that the vehicle is in the autonomous driving on the straight road or the low curvature road close to the straight line, only the rear wheel (Rr) positioned on the side to be steered may be determined as the tire to which the braking pressure is applied.

That is, when the partial braking occurs on the rear wheel on one side during the traveling on the low curvature road, the rotational force for rotating the front wheels on the left and right sides and the rear wheel to which the braking pressure is not applied among the rear wheels around the rear wheel to which the braking pressure is applied may be generated. Because the rotational force generated as such may generate the steering angle that changes the traveling direction of the vehicle along the rotation direction thereof, in spite of the malfunction of the steering system, the steering control for changing the lane in the direction of the shoulder or the like becomes possible.

Furthermore, in the partial braking position determination process (S330), when it is determined in the lane change determination process that the vehicle is in the autonomous driving on the high curvature road close to the curve requiring the turning, both the front wheel (Frt) and the rear wheel (Rr) positioned on the side to be steered may be determined as the tires to which the braking pressure is applied.

That is, when the braking pressure is applied together to the front wheel and the rear wheel on one side of the vehicle, and thus, the partial braking occurs during the traveling on the high curvature road, the rotational force for rotating the tire on the side to which the braking pressure is not applied toward the side to which the braking pressure is applied may be generated. The rotational force generated as such may generate the steering angle for moving the vehicle to the side where the partial braking has occurred, that is, for changing the lane in the direction of the shoulder. Thus, in spite of the malfunction of the steering system, the steering control for the lane change in the direction of the shoulder becomes possible.

In the present connection, whether the vehicle is in the autonomous driving on the low curvature road may be determined in the lane change determination process (S320) based on the result of the comparing between the road curvature with the reference curvature. Accordingly, when the road curvature is smaller than the first reference curvature, it may be determined that the vehicle is traveling on the low curvature road. Furthermore, when the road curvature is greater than the first reference curvature but smaller than the second reference curvature, it may be determined that the vehicle is traveling on the high curvature road.

By subdividing and determining the position of the tire to which the braking force is to be applied to occur the partial braking based on the curvature of the road in the partial braking position determination process (S330) as described above, it is possible to prevent the vehicle from rotating excessively on the low curvature road, and from oscillating while rotating insufficiently on the high curvature road.

Furthermore, in the case of the vehicle in which the trailer is coupled to the tractor, the partial braking induction determination operation (S300) may further include a rotation support process (S340) of supporting the steering control of the vehicle with the malfunctioning steering system by allowing the parking braking to occur on the tire on one side of the trailer in addition to the braking force generated on the tire on one side of the tractor.

In the present connection, in the rotation support process (S340), when it is determined that the vehicle is in the autonomous driving on the high curvature road, both the front wheel and the rear wheel positioned on the side to be steered among the tires of the tractor may be determined as the tires to which the braking force is applied, and also the tires on the side opposite to the side where the partial braking of the tractor occurs among the tires of the trailer may be determined as the tires to which the braking force is applied.

Accordingly, by allowing the partial braking to occur on the trailer at the position opposite to the position of the tire where the partial braking occurs of the tractor, it is possible to generate the rotational force for rotating the kingpin that couples the trailer to the tractor in the direction to be steered like the steering wheel.

Accordingly, the stability of the lane change induced by the partial braking may be improved by pushing the tractor in the direction to be steered by the partial braking occurring on the tire on one side of the trailer to support the rotational force required for the lane change, as well as allowing the trailer to enter the line on the high curvature road.

Furthermore, in the rotation support process (S340), when it is determined that the vehicle is in the autonomous driving on the straight road or the low curvature road close to the straight line at the high speed, both the front wheel and the rear wheel positioned on the side to be steered among the tires of the tractor may be determined as the tires to which the braking force is applied, and also the tires on the side the same as the side where the partial braking of the tractor occurs among the tires of the trailer may be determined as the tires to which the braking force is applied.

In the present connection, in the rotation support process (S340), the case in which the vehicle in the autonomous driving is traveling on the low curvature road at the speed equal to or greater than 90 km/h may be determined as the high speed traveling state that requires the application of the braking force even to the tire on one side of the trailer by the rotation support device. However, the speed for determining whether the vehicle is at the high speed may be set differently, as well as the speed for determining whether the vehicle is at the high speed based on the total weight of the trailer may be set differently.

As described above, the oscillation which may occur in the tractor rotating by the partial braking occurred in the tractor may be reduced by allowing the partial braking to occur on the trailer at the position the same as the position of the tire where the partial braking occurs in the tractor.

Accordingly, the degree of deviation of the trailer in the lateral direction from the center portion of the vehicle may be reduced in the case in which the rotational force for changing the lane is supported by the trailer, compared to the case in which it is not.

Furthermore, in the partial braking control operation (S400), the amount of braking to be applied to each tire of the vehicle determined in the partial braking position determination process to allow the partial braking to occur may be determined and the braking pressure corresponding to the determined amount of braking may be applied to each tire of the vehicle to perform the steering control by the partial braking.

Furthermore, in the partial braking control operation (S400), when it is desired to perform the steering control by the partial braking for changing the lane, the vehicle may be decelerated to reach a certain target speed while keeping the traveling line when it is not easy to change the lane, such as when there is a traveling vehicle in an adjacent line. Thereafter, the vehicle may be controlled to move to the shoulder or the like and stop while the steering control by the partial braking is performed.

In the present connection, in the partial braking control operation (S400), after setting each of the low amount of braking, the medium amount of braking, and the high amount of braking having the value in the certain range in advance to enable the rapid response in the emergency situation, one of the amounts of braking may be determined as the amount of braking to be applied to the tire.

Accordingly, in the partial braking control operation (S400), when it is desired to perform the steering control of the vehicle by the partial braking during the traveling while keeping the lane on the road with the low curvature (the lane keeping & the low curvature), the amount of braking to be applied to the tire on one side of the rear wheel of the vehicle determined in the partial braking position determination process (S330) may be determined as the medium amount of braking.

When applying the medium amount of braking (the middle braking) to the rear wheel on one side of the vehicle Accordingly, the degree of steering control of the vehicle may be changed larger and faster, but the oscillation of shaking in the left and right direction may occur while the vehicle moves until the vehicle stops.

Furthermore, in the partial braking control operation (S400), when it is desired to perform the steering control of the vehicle by the partial braking during the traveling while keeping the lane on the road with the low curvature (the lane keeping & the low curvature), to reduce such oscillation, the amount of braking to be applied to the tire on one side of the rear wheel of the vehicle determined in the partial braking position determination process (S330) may be determined as the low amount of braking.

When applying the low amount of braking (the low braking) to the rear wheel on one side of the vehicle Accordingly, it is possible to reduce the oscillation in which the vehicle shakes in the left and right direction thereof, so that the more stable steering control may be performed.

Furthermore, in the partial braking control operation (S400), when it is desired to perform the steering control of the vehicle by the partial braking while changing the lane on the high curvature road (lane changing & high curvature), the amount of braking to be applied to the rear wheel of the vehicle determined in the partial braking position determination process (S330) may be determined as the high amount of braking.

When applying the high amount of braking (the high braking) to the rear wheel of the vehicle to change the lane Accordingly, although the rapid steering and the deceleration may be made, the lateral error (the Error Y) in which the vehicle deviates excessively in the lateral direction may increase.

Accordingly, in the partial braking control operation (S400), to reduce such lateral error, when it is desired to perform the steering control of the vehicle by the partial braking while changing the lane on the high curvature road (the lane changing & the high curvature), the front wheel and the rear wheel on one side of the vehicle may be determined as the position where the partial braking occurs by the partial braking position determination process (S330), and the amount of braking to be applied together to the front wheel and the rear wheel on one side of the vehicle may be determined as the medium amount of braking.

When applying the medium amount of braking (the middle braking) together to the front wheel and the rear wheel on one side of the vehicle. Accordingly, the lateral error (the Error Y) is reduced, so that the more stable steering control may be performed.

Furthermore, the partial braking control operation (S400) may further include a stop determination operation (S500) of, when the vehicle fully enters the shoulder as the result of the steering control induced by the partial braking, or when the vehicle stops in the line without changing the lane as it is difficult to change the lane only by the steering control by the partial braking because the steering angle is too large or the road curvature exceeds the reference curvature, detecting the same and stopping the vehicle.

The description above is merely illustrative of the technical idea of the present invention, and various modifications and changes may be made by those skilled in the art without departing from the essential characteristics of the present invention.

Therefore, the exemplary embodiments disclosed in various exemplary embodiments of the present invention are not intended to limit the technical idea of the present invention but to illustrate the present invention, and the scope of the technical idea of the present invention is not limited by the embodiments. The scope of the present invention should be construed as being covered by the scope of the appended claims, and all technical ideas falling within the scope of the claims should be construed as being included in the scope of the present invention.

The present invention may prevent the risk of obstructing the traffic flow of the vehicle traveling from the rear by moving the vehicle to the shoulder or the like by the emergency steering control by the partial braking performed on the tire on one side of the vehicle in which the steering system malfunctions during the autonomous driving.

Furthermore, the present invention may not only perform the more precise steering control by differentiating the positions and number of tires on which the partial braking is performed based on the curvature of the road on which the vehicle is traveling, but also improve the travel stability of the vehicle by minimizing the occurrence of the oscillation when traveling while maintaining the lane.

Furthermore, in the case of the vehicle in which the trailer is coupled to the tractor, and when the rotational force for the steering control in the tractor is insufficient, the present invention may improve safety of a host vehicle and a surrounding vehicle by allowing the trailer to enter the line, as well as allowing the insufficient rotational force to be supported by the trailer.

Furthermore, various effects directly or indirectly identified through the present specification may be provided.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by multiple control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A system for controlling stop of a vehicle, the system comprising:
    a shoulder stop control device configured to generate a shoulder stop command of a reference path for guiding the vehicle to a shoulder in a traveling road of the vehicle when a malfunction of a steering system in the vehicle is detected during autonomous driving of the vehicle;
    a steering angle comparison device configured to detect a current steering angle of the vehicle and to compare the detected current steering angle with a preset limit steering angle;
    a partial braking induction determination device configured to determine a position of a tire of the vehicle to be subjected to partial braking for steering control of the vehicle according to a result of the comparing between the current steering angle and the preset limit steering angle; and
    a partial braking control device configured to determine an amount of braking to be applied to each determined tire of the vehicle and apply a braking pressure corresponding to the amount of braking to each tire of the vehicle to perform the steering control by the partial braking.

2. The system of claim 1, wherein the partial braking induction determination device includes:
    a curvature comparison device configured to compare a curvature of the traveling road of the vehicle in the autonomous driving with a predetermined reference curvature;
    a lane change determination device configured to perform the steering control by the partial braking for changing a lane when the curvature is smaller than the predetermined reference curvature as a result of the comparing the curvature, and to determine to stop in a line without inducing the changing the lane when the curvature is greater than the predetermined reference curvature; and
    a partial braking position determination device configured to determine the tire to be subjected to the partial braking for inducing a traveling direction of the vehicle in a direction of the shoulder.

3. The system of claim 2, wherein the curvature comparison device is configured to individually set a first reference curvature for determining whether the road is a low curvature road close to a straight line, and a second reference curvature for determining whether the road is a curved high curvature road requiring a steering angle of a level equal to or greater than a predetermined level.

4. The system of claim 2, wherein the lane change determination device is configured to determine to perform the steering control by the partial braking on a low curvature road when the curvature is smaller than a preset first reference curvature, and to determine to perform the steering control by the partial braking on a high curvature road when the curvature is greater than the first reference curvature but smaller than a preset second reference curvature.

5. The system of claim 4, wherein the partial braking position determination device is configured to determine a rear wheel of the vehicle positioned on a side thereof to be steered as a braking pressure-applied-tire when the lane change determination device concludes that the vehicle is in the autonomous driving on the low curvature road.

6. The system of claim 4, wherein the partial braking position determination device is configured to determine a front wheel and a rear wheel of the vehicle positioned on a side thereof to be steered as braking pressure-applied-tires when the lane change determination device concludes that the vehicle is in the autonomous driving on the high curvature road.

7. The system of claim 2, wherein the partial braking induction determination device further includes a rotation support device configured to support steering control of a tractor by allowing parking braking to occur on a tire on one side of a trailer in addition to partial braking occurring on a tire on one side of the tractor in a case of the vehicle with the trailer coupled to the tractor.

8. The system of claim 7, wherein the rotation support device is configured to determine a front wheel and a rear wheel positioned on a side to be steered among tires of the tractor as braking force-applied-tires, and also is configured to determine tires on a side opposite to the side where the partial braking of the tractor occurs among tires of the trailer as the braking force-applied-tires when the vehicle is in the autonomous driving on a high curvature road.

9. The system of claim 7, wherein the rotation support device is configured to determine a front wheel and a rear wheel positioned on a side to be steered among tires of the tractor as braking force-applied-tires, and also is configured to determine tires on a side a same as the side where the partial braking of the tractor occurs among tires of the trailer as the braking force-applied-tires when the vehicle is in the autonomous driving on a low curvature road at a speed higher than a predetermined speed.

10. The system of claim 4, wherein the partial braking control device is configured to determine an amount of braking to be applied to a rear wheel on one side of the vehicle determined by the partial braking position determination device as a medium amount of braking when it is preferred to perform the steering control of the vehicle by the partial braking during traveling while keeping the lane on the low curvature road.

11. The system of claim 4, wherein the partial braking control device is configured to determine an amount of braking to be applied to a rear wheel on one side of the vehicle determined by the partial braking position determination device as a low amount of braking when it is preferred to perform the steering control of the vehicle by the partial braking during traveling while keeping the lane on the low curvature road.

12. The system of claim 4, wherein the partial braking control device is configured to determine an amount of braking to be applied to a rear wheel on one side of the vehicle determined by the partial braking position determination device as a high amount of braking when it is preferred to perform the steering control of the vehicle by the partial braking while changing the lane on the high curvature road.

13. The system of claim 4, wherein the partial braking control device is configured to determine an amount of braking to be applied together to a front wheel and a rear wheel on one side of the vehicle determined by the partial braking position determination device as a medium amount of braking when it is preferred to perform the steering control of the vehicle by the partial braking while changing the lane on the high curvature road.

14. A method for controlling stop of a vehicle, the method comprising:
a shoulder stop control operation for generating a shoulder stop command of a reference path for guiding the vehicle to a shoulder in a traveling road of the vehicle when a malfunction of a steering system in the vehicle is detected during autonomous driving of the vehicle;
a steering angle comparison operation for detecting a current steering angle of the vehicle and comparing the detected current steering angle with a preset limit steering angle;
a partial braking induction determination operation for determining a position of a tire of the vehicle to be subjected to partial braking for steering control of the vehicle according to a result of the comparing between the current steering angle and the preset limit steering angle; and
a partial braking control operation for determining an amount of braking to be applied to each determined tire of the vehicle and applying a braking pressure corresponding to the amount of braking to each tire of the vehicle to perform the steering control by the partial braking.

15. The method of claim 14, wherein the partial braking induction determination operation includes:
a curvature comparison process for comparing a curvature of a traveling road of the vehicle in the autonomous driving with a predetermined reference curvature;
a lane change determination process for performing the steering control by the partial braking for changing a lane when the curvature is smaller than the predetermined reference curvature as a result of the comparing the curvature, and determining to stop in a line without inducing the changing the lane when the curvature is greater than the predetermined reference curvature; and
a partial braking position determination operation for determining the tire to be subjected to the partial braking for inducing a traveling direction of the vehicle in a direction of the shoulder.

16. The method of claim 15, wherein the lane change determination process includes:
determining to perform the steering control by the partial braking on a low curvature road when the curvature is smaller than a preset first reference curvature, and determining to perform the steering control by the partial braking on a high curvature road when the curvature is greater than the first reference curvature but smaller than a preset second reference curvature.

17. The method of claim 16, wherein the partial braking position determination process includes:
determining a rear wheel of the vehicle positioned on a side thereof to be steered as a braking pressure-applied-tire when it is determined in the lane change determination process that the vehicle is in the autonomous driving on the low curvature road.

18. The method of claim 16, wherein the partial braking position determination process includes:
determining a front wheel and a rear wheel of the vehicle positioned on a side thereof to be steered as braking pressure-applied-tires when it is determined in the lane change determination process that the vehicle is in the autonomous driving on the high curvature road.

19. The method of claim 15, wherein the partial braking induction determination operation further includes:
a rotation support process for determining a front wheel and a rear wheel positioned on a side to be steered among tires of a tractor as braking force-applied-tires, and also determining tires on a side opposite to the side where the partial braking of the tractor occurs among tires of the trailer as the braking force-applied-tires when it is determined that the vehicle with the trailer coupled to the tractor is in the autonomous driving on a high curvature road.

20. The method of claim 15, wherein the partial braking induction determination operation further includes:
a rotation support process for determining a front wheel and a rear wheel positioned on a side to be steered among tires of the tractor as braking force-applied-tires, and also determining tires on a side a same as the side where the partial braking of the tractor occurs among tires of the trailer as the braking force-appliedtires when it is determined that the vehicle with the trailer coupled to the tractor is in the autonomous driving on a low curvature road at a speed higher than a predetermined speed.

\* \* \* \* \*